3,450,757
BROMINATION PROCESS

Charles A. Carroll, Hillsdale, and James J. Vaka, Englewood, N.J., assignors to Lever Brothers Company, New York, N.Y., a corporation of Maine
No Drawing. Filed June 9, 1967, Ser. No. 644,817
Int. Cl. C07c *103/20*
U.S. Cl. 260—559   5 Claims

ABSTRACT OF THE DISCLOSURE

A process for the bromination of salicylanilide with from about 2.8 moles to about 3.5 moles of bromine for each mole of salicylanilide which utilizes an inexpensive aqueous sulfuric acid reaction medium in order to produce a light colored germicidal mixture of reaction products rich in 3,4′,5 - tribromosalicylanilide and low in undesired 3,5-dibromosalicylanilide content.

---

The present invention relates to a bromination process and more particularly to a process for the bromination of salicylanilide to produce a mixture of the brominated derivatives of salicylanilide composed predominantly of 3,4′,5-tribromosalicylanilide using a novel reaction medium.

Heretofore, a variety of reaction media has been used in the bromination of salicylanilide with liquid bromine. Typical of such reaction media are aqueous benzene (U.S. Patent No. 3,149,157), aqueous chlorinated hydrocarbons (U.S. Patent No. 3,149,156) and aqueous paradioxane (U.S. Patent No. 3,152,177). The use of the above three reaction media in the bromination of salicylanilide with liquid bromine results, however, in the production of a predominant amount of 4′,5-dibromosalicylanilide rather than a predominant amount of 3,4′,5-tribromosalicylanilide.

Other reaction media which have been utilized heretofore in the bromination of salicylanilide with liquid bromine include aqueous alcohol (U.S. Patent No. 2,997,502), aqueous acetic acid (U.S. Patent No. 3,057,920) and aqueous surfactants (U.S. Patent No. 3,064,048). The use of these three reaction media result in the production of a predominant amount of 3,4′,5-tribromosalicylanilide as opposed to a predominant amount of 4′,5-dibromosalicylanilide.

Accordingly, it is readily apparent that the nature of the reaction medium in some unknown way results in the orientation of the bromine atoms on the salicylanilide nucleus and in the amount of bromine substituted for the hydrogen atoms on the salicylanilide nucleus. However, the specificity which any reaction medium will give in the bromination of salicylanilide is clearly unpredictable in view of the disclosures in the above mentioned six representative patents.

The reaction media utilized heretofore in the bromination of salicylanilide with liquid bromine to produce a predominant amount of 3,4′,5-tribromosalicylanilide suffer from the drawback that the additive present in the aqueous reaction media is costly and accordingly a recovery step to recover the costly additive is necessary. Moreover, the utilization of an aqueous surfactant reaction medium results in an inadequate amount of the 3,4′,5-tribromosalicylanilide in the mixture of brominated salicylanilide produced in that only from about 70% to about 80% of the mixed brominated salicylanilides is 3,4′,5-tribromosalicylanilide. Although water can be utilized as the reaction medium in the bromination of salicylanilide to produce a predominant amount of 3,4′,5-tribromosalicylanilide and accordingly obviate the need for a solvent recovery step, nevertheless, the use of water as the reaction medium gives a mixture of brominated salicylanilides which is dark in color, contains excessive amounts, e.g., about 12%, of 3,5-dibromosalicylanilide having low germicidal activity and low skin substantitivity and hence being without value as a germicide in soap, and further contains only about 78% of 3,4′,5-tribromosalicylanilide.

Therefore, it is the object of the present invention to provide for the preparation of a light-colored mixture of brominated derivatives of salicylanilide in high yield composed predominantly, i.e., at least about 80% by weight, of 3,4′,5-tribromosalicylanilide and being low in undesirable 3,5-dibromosalicylanilide content utilizing a novel reaction medium which is inexpensive so that a solvent recovery step can be obviated.

In accordance wth the process of the invention one mole of salicylanilide is brominated with about 2.8 to about 3.5, preferably about 3, moles of liquid bromine in a reaction medium made up of from about 99.5% to about 92%, preferably about 95%, by weight of water and from about 0.5% to about 8%, preferably about 5%, by weight respectively of sulphuric acid.

Salicylanilide is insoluble in the reaction medium at the reaction temperatures. Stirring therefore is essential throughout the reaction in order to keep the system uniform. Enough of the reaction medium should be used to ensure complete suspension of the salicylanilide, but apart from this the amount is in no way critical. The larger the volume of the reaction medium, the more difficult the mix is to handle and the more dilute will be the suspension, so that the reaction will proceed more slowly. A reaction medium having a concentration of less than about 5% salicylanilide thus would not normally be used. At a concentration in excess of about 12% the reaction mixture becomes quite thick and difficult to stir. Generally a concentration of from about 8% to about 10% is employed.

The reaction proceeds smoothly at a temperature within the range from about 40° C. to about 70° C. Generally from about 55° C. to about 65° C. is employed, since at the more elevated temperatures the color of the product may be dark. At temperatures below 40° C. the reaction proceeds too slowly to be practical.

The bromine is usually added slowly, for example dropwise or in small increments, over a period of from ½ to 5 hours. After all of the bromine has been added, the reaction mixture is held at the reaction temperature for sufficient time to allow the reaction to proceed to completion, usually in about ½ to 2 hours' time. The reaction mixture then can be cooled to room temperature or lower, and is filtered to remove the desired product which also is insoluble in the reaction medium.

The process of the invention will be illustrated by the following examples.

Examples 1–4

One mole (213 grams) of salicylanilide was suspended in 2,000 grams of various aqueous sulphuric acid reaction media having a sulphuric acid concentration by weight set forth below and heated to .55° C.–65° C. Three moles (480 grams) of liquid bromine were then added dropwise over a 90-minute period while stirring and maintaining the temperature of the suspension between 55° C. and 65° C. The product was aged for one hour at 55° C. to 65° C. before quick cooling to 11° C. The product was then filtered, washed twice with methanol and dried.

The total yield and analyses of the dark colored (comparative Example 1) and light colored (Examples 2–4) brominated salicylanilide products were as set forth in the following table. The isomer distribution in the products of Examples 1–4 was determined by ultraviolet light analysis.

| Example No. | Concentration of sulphuric acid (percent) | Total yield (percent) | Isomer Distribution (percent) | | | | | | |
|---|---|---|---|---|---|---|---|---|---|
| | | | 4' | 5 | 3, 4' | 3, 5 | 4', 5 | 2', 3, 5 | 3, 4', 5 | 2', 3, 4', 5 |
| 1 | 0 | 89.2 | | 1.3 | 0.4 | 11.9 | 3.5 | 1.7 | 77.7 | 2.8 |
| 2 | 1 | 93 | Trace | 1.1 | 0.5 | 6.8 | 3.5 | 1.4 | 83.4 | 3.1 |
| 3 | 5 | 90.3 | | 0.1 | 0.2 | 6.2 | 3.7 | 1.2 | 83.7 | 2.5 |
| 4 | 7 | 90 | 0.1 | 0.4 | 0.4 | 5.2 | 2.9 | 0.9 | 81.9 | 3.0 |

The mixed brominated derivatives of salicylanilide containing a predominant amount of 3,4',5-tribromosalicylanilide are well known to be utilizable as germicides in a variety of compositions, such as soaps.

It will be appreciated that various modifications and variations may be made in the process of the invention, in addition to those set forth above, by those skilled in the art without departing from the spirit of the invention and that accordingly the invention is to be limited only within the scope of the appended claims.

What is claimed is:

1. A process of preparing a mixture of brominated derivatives of salicylanilide composed predominantly of 3,4',-5-tribromosalicylanilide which comprises brominating salicylanilide with from about 2.8 moles to about 3.5 moles of bromine for each mole of salicylanilide in a reaction medium consisting essentially of from about 99.5% to about 92% by weight of water and from about 0.5% to about 8% by weight respectively of sulfuric acid.

2. The process in accordance with claim 1 wherein the bromine is added slowly.

3. The process in accordance with claim 1 wherein the reaction medium consists essentially of about 95% by weight of water and about 5% by weight respectively of sulfuric acid.

4. The process in accordance with claim 1 wherein the bromination is conducted at a temperature from about 55° C. to about 65° C.

5. The process in accordance with claim 1 wherein the amount of bromine is about 3 moles of bromine for each mole of salicylanilide.

References Cited

UNITED STATES PATENTS 3,254,121   5/1966   Majewski _____ 260—559

HENRY R. JILES, *Primary Examiner.*

HARRY I. MOATZ, *Assistant Examiner.*